US011316359B1

(12) United States Patent
Appelbaum et al.

(10) Patent No.: US 11,316,359 B1
(45) Date of Patent: *Apr. 26, 2022

(54) SMART ENERGY DISTRIBUTION METHODS AND SYSTEMS FOR ELECTRIC VEHICLE CHARGING

(71) Applicant: EVERCHARGE, INC., San Francisco, CA (US)

(72) Inventors: Jason Appelbaum, Oakland, CA (US); Mario Landau-Holdsworth, Portland, OR (US); Amber Case, Portland, OR (US)

(73) Assignee: Evercharge, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/929,642

(22) Filed: Jul. 15, 2020

Related U.S. Application Data (63) Continuation of application No. 15/610,343, filed on May 31, 2017, now Pat. No. 10,756,549, which is a
(Continued)

(51) Int. Cl.
*H02J 7/00* (2006.01)
*B60L 53/14* (2019.01)
(Continued)

(52) U.S. Cl.
CPC .............. *H02J 7/007* (2013.01); *B60L 3/04* (2013.01); *B60L 53/14* (2019.02); *B60L 53/30* (2019.02);
(Continued)

(58) Field of Classification Search
CPC ....... H02J 7/007; H02J 7/00034; B60L 53/14; B60L 53/30; B60L 53/63; B60L 53/65;
(Continued)

(56) References Cited

U.S. PATENT DOCUMENTS

2011/0221393 A1   9/2011  Billmaier
2012/0229082 A1*  9/2012  Vukojevic ............ H02J 7/0013
                                                          320/108
(Continued)

FOREIGN PATENT DOCUMENTS

JP  2013109609 A   6/2013
WO  2011126600     1/2012
(Continued)

OTHER PUBLICATIONS

PCT/US2015/021612, Written Opinion of the International Searching Authority, dated May 29, 2015.

*Primary Examiner* — Nathaniel R Pelton
(74) *Attorney, Agent, or Firm* — Renaissance IP Law Group, LLP; David A. Crowther (57) ABSTRACT

A power management system can smartly allocate the available power at a location to support more electric vehicles than would otherwise be possible. Power managers can intelligently allocate that power based on the real-time needs of vehicles. A smart energy distribution system can estimate each vehicle's current charge level and use such information to efficiently provide electric vehicle charging. The system can respond dynamically to vehicle charge levels, current readings, and/or electrical mains readings, allocating more current where it is needed. The charger profiles can include historic charge cycle information, which can be analyzed under a set of heuristics to predict future charging needs. A local electric vehicle charging mesh network can be provided, which transmits data packets among short-range transceivers of multiple power managers. The local electric vehicle charging mesh network can be connected to a remote server via a cellular connection. The power managers and the local electric vehicle charging mesh network can intelligently allocate power to multiple electric vehicles.

18 Claims, 9 Drawing Sheets

Related U.S. Application Data continuation of application No. 14/663,398, filed on Mar. 19, 2015, now Pat. No. 9,685,798.

(60) Provisional application No. 61/979,186, filed on Apr. 14, 2014, provisional application No. 61/968,311, filed on Mar. 20, 2014.

(51) Int. Cl.
| | | |
|---|---|---|
| *B60L 53/65* | (2019.01) | |
| *B60L 53/30* | (2019.01) | |
| *B60L 53/63* | (2019.01) | |
| *B60L 3/04* | (2006.01) | |
| *B60L 58/12* | (2019.01) | |

(52) U.S. Cl.
CPC ............... *B60L 53/63* (2019.02); *B60L 53/65* (2019.02); *B60L 58/12* (2019.02); *B60L 2240/547* (2013.01); *B60L 2240/549* (2013.01); *B60L 2240/72* (2013.01); *B60L 2240/80* (2013.01); *B60L 2260/52* (2013.01); *B60L 2260/54* (2013.01); *H02J 7/00034* (2020.01); *Y02E 60/00* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/12* (2013.01); *Y04S 30/14* (2013.01)

(58) Field of Classification Search
CPC . B60L 58/12; B60L 3/04; Y02E 60/00; Y02T 10/70; Y02T 10/7072; Y02T 10/72; Y02T 90/12; Y02T 90/14; Y02T 90/16; Y02T 90/167; Y04S 10/126; Y04S 30/12; Y04S 30/14
USPC ........................................................ 320/138
See application file for complete search history.

(56) References Cited

U.S. PATENT DOCUMENTS

| | | | |
|---|---|---|---|
| 2012/0271758 A1 | 10/2012 | Jammer | |
| 2012/0277927 A1* | 11/2012 | Watkins | ................. B60L 53/14 700/292 |
| 2012/0330494 A1* | 12/2012 | Hendrix | ................. B60L 53/60 701/29.3 |
| 2013/0024306 A1 | 1/2013 | Shah et al. | |
| 2013/0204471 A1 | 8/2013 | Hamilton et al. | |
| 2013/0211988 A1 | 8/2013 | Dorn et al. | |
| 2013/0335033 A1 | 12/2013 | Kuribayashi et al. | |

FOREIGN PATENT DOCUMENTS

| | | |
|---|---|---|
| WO | 2013009178 A2 | 1/2013 |
| WO | 2013100764 A1 | 7/2013 |

* cited by examiner

| POWER MANAGERS | V1 | V2 | V3 | V4 | V5 |
|---|---|---|---|---|---|
| USER REQUEST — 505 | YES | YES | YES | YES | NO |
| INSTALL DEFINED MAX CHARGE LEVEL — 510 | 50 | 50 | 50 | 50 | 0 |
| t=0, ALLOCATION BASED ON AVAILABILITY — 515 | 25 | 25 | 25 | 25 | 0 |
| BUFFERED / ELECTRICAL CODE REQUIREMENTS — 520 | 20 | 20 | 20 | 20 | 0 |
| t=1, CURRENT SENSOR READING — 525 | 5 | 20 | 20 | 5 | --- |
| t=2, NEW AMP ALLOCATION — 530 | 5 | 35 | 35 | 5 | --- |
| t=3, 2ND CURRENT DRAW READING — 535 | 0 | 35 | 35 | 0 | --- |
| t=4, NEW AMP ALLOCATION — 540 | 0 | 40 | 40 | 0 | --- |

SMART ENERGY DISTRIBUTION METHODS AND SYSTEMS FOR ELECTRIC VEHICLE CHARGING

RELATED APPLICATION DATA

This application is a continuation of co-pending commonly-owned U.S. patent application Ser. No. 15/610,343, filed May 31, 2017, which is a continuation of commonly-owned U.S. patent application Ser. No. 14/663,398, filed Mar. 19, 2015, which claims the benefit of U.S. provisional patent application Ser. No. 61/968,311, filed Mar. 20, 2014, and claims the benefit of U.S. provisional patent application Ser. No. 61/979,186, filed Apr. 14, 2014, which are hereby incorporated by reference.

FIELD

This disclosure relates to electric vehicles, and, more particularly, to smart energy distribution methods and systems for electric vehicle charging allocation techniques and multi-level garage electrical vehicle charging infrastructure.

BACKGROUND

The adoption of electric vehicles, plug-in hybrid electric vehicles, and the like, continues at a rapid pace. The charging infrastructure is still in its infancy and many challenges remain including scaling, efficiency, and cost barriers. Conventional charging and energy distribution systems lack any significant level of built-in intelligence, and as a result, the methods used for charging electric vehicles are usually wasteful and inefficient.

Moreover, as the deployment of electric vehicles increases, the charging infrastructure must be adapted to meet demand Multi-level parking spaces used in apartment complexes, shopping malls, downtown parking garages, and the like, suffer from a variety of unique problems such as the coordination of charging devices among the various levels. Many such parking spaces are constructed of dense materials such as cement and steel, which impede conventional wireless networking solutions. This in turn diminishes the coordination and communication of different components of a charging system or network, and consequently, the intelligence of such conventional systems are either difficult to implement, too costly to install, or simply impossible.

Accordingly, a need remains for improved methods and systems for efficiently and intelligently distributing energy to electric vehicles. Embodiments of the invention address these and other limitations in the prior art.

The foregoing and other features of the invention will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first electric vehicle could be termed a second electric vehicle, and, similarly, a second electric vehicle could be termed a first electric vehicle, without departing from the scope of the inventive concept.

Like numbers refer to like elements throughout. The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Reference is often made herein to "electric vehicles." It will be understood that such vehicles can include plug-in hybrid vehicles, pure electric vehicles, or any one of a variety of vehicles that operate or move using at least some electricity. The term "control signal" as referred to herein can be a "pilot signal," or other suitable control signal. The term "pilot signal" as referred to herein can be a low voltage connection that is used to control a level of current draw that the electric vehicle requests or is allowed to request.

Embodiments of the invention include a power management system that smartly allocates the available power at a location to support more electric vehicles than would otherwise be possible. When a power manager has the information about the amount of available power available on a given supply, it can intelligently allocate that power based on the real-time needs of vehicles. By monitoring the current draw on each electric vehicle using a current sensor or by accessing the electric vehicle's state of charge through an API accessed through a remote access or server network (which can include information about user history or input, real-time data, and/or historical data), a smart energy distribution system disclosed herein can estimate each vehicle's current charge level and use this information to provide the minimum amount of needed current with or without a buffer to the electric vehicle. This system works with one or many electric vehicles using the charging system.

Such approach allows a site electrical capacity to be allocated efficiently and uses a low voltage signal to have the electric vehicles regulate charge levels internally, as further explained below. The system can respond dynamically to vehicle charge levels, current readings, and/or electrical mains readings, allocating more current where it is needed. Cycle point and/or charger profiles for individual electric vehicles can be determined and/or stored. The charger profiles can include historic charge cycle information, which can be used and analyzed under a set of heuristics to predict future charging needs, including expected time-of-day and charge level approximations.

A local electric vehicle charging mesh network can be provided, which transmits data packets among short-range transceivers of multiple power managers that are configured to be part of the local electric vehicle charging mesh network. The local electric vehicle charging mesh network can be connected to a remote server via a cellular connection, which is disposed at a location associated with a parking structure that provides a sufficient and/or reliable cellular reception. The power managers and the local electric vehicle charging mesh network can intelligently and unevenly allocate power to multiple electric vehicles using the local electric vehicle charging mesh network. The remote server can provide analytical information about the local electric vehicle charging mesh network, the power managers, the electric vehicles, and the like, as further described in detail below. The remote server can be located in a geographical location entirely different from the parking structure, such as at a control center in another city, state, or country. Alternatively, the remote server can be located proximate to or within the parking structure. In this embodiment, the remote server is "remote" to the mesh network.

Figure 1:
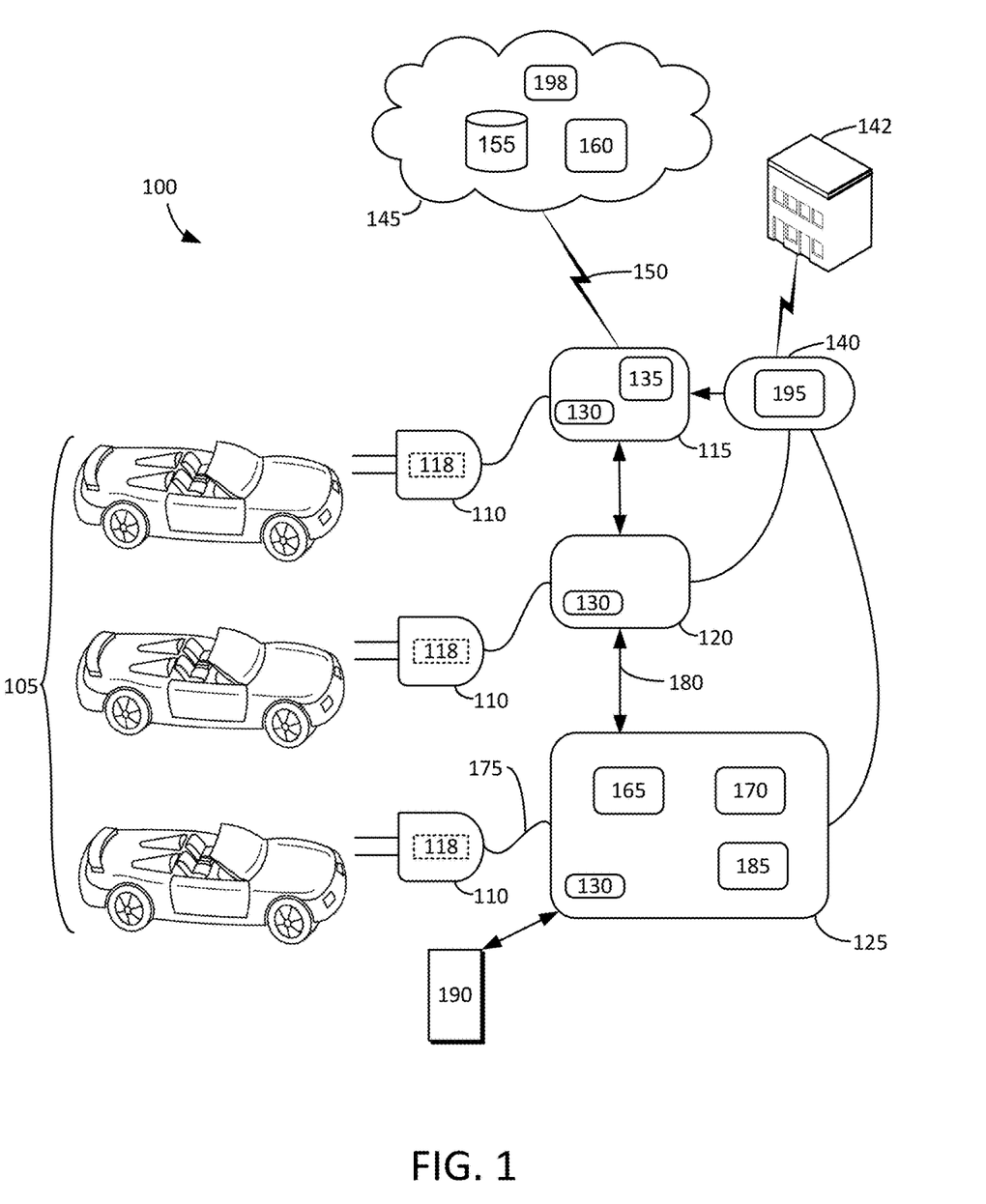
FIG. 1 illustrates a smart energy distribution system for providing smart energy distribution via an intelligent control signal in accordance with various embodiments of the present invention.

FIG. 1 illustrates a smart energy distribution system 100 for providing smart energy distribution via an intelligent control signal (e.g., 118) in accordance with various embodiments of the present invention. The smart energy distribution system 100 can include electric vehicles 105, current sensors 130, pilot signals 118, insulated and/or isolated connectors 110, a remote server 145, a database of user identifiers (IDs) 155, control logic 160, power managers (e.g., 115, 120 and 125), and a power source 140. Alternatively or in addition, the control logic 160 can be localized to each power manager. For example, the power manager 115 can include control logic 135. One or more of the power managers 115, 120, and 125 can be connected to the power source 140. The one or more power managers 115, 120, and 125 can use a pilot signal 118 to regulate the amount of power an electric vehicle 105 is allowed to draw. The pilot signals 118 supplied to the different vehicles 105 can be varied based on the control logic 160, which can optionally be localized (e.g., 135) and/or modified by information received over a network connection 150. The network connection 150 can include or otherwise be connected to, for example, the Internet. The information received over the network connection 150 can include real-time information about energy demand elsewhere at one or more other locations (not shown).

The power managers 115, 120, and/or 125 can each include or be associated with a microprocessor (e.g., 165), a pilot signal generator (e.g., 170), an electric vehicle connector cord (e.g., 175), and/or a wired or wireless communication connection (e.g., 180) to interface with other power managers and/or with a network. The power managers 115, 120, and/or 125 can determine the state of charge (e.g., 185) of one or more of the electric vehicles 105 (e.g., the approximate point in the electric vehicle's charge cycle). It will be understood that while three electric vehicles 105 are shown, any suitable number of electric vehicles can be used with or otherwise charged by the smart energy distribution system 100.

Using the approximate state of charge 185 of an electric vehicle 105 and the pilot signal 118, charge between multiple power managers (e.g., 115, 120, and 125) can be managed using the control logic (e.g., 160 and/or 135) to have the electric vehicles 105 internally regulate how much power each will draw from the power source 140. In other words, the power managers (e.g., 115, 120, and 125) can generate and/or control the pilot signal 118 for each electric vehicle, which can cause each electric vehicle 105 to limit and/or alter the amount of power that it will draw over time.

The information about the electric vehicle's state of charge 185 (e.g., point in its charge cycle) can be stored in the remote server 145 and/or accessed via the network 150. The power managers (e.g., 115, 120, and 125) can use pilot signals 118 to control the electric vehicles' internal control of current draw to regulate amperage so that the total amperage for a given charging location does not exceed the amount of power available at the given charging location. The power managers (e.g., 115, 120, and 125) can allocate available power to the electric vehicles 105 using the reading from current sensors 130 associated with each of the corresponding power managers (e.g., 115, 120, and 125) and electric vehicles 105 to predict the appropriate allocation of power to each electric vehicle 105. The system can include a user input device 190, which can allow a user (e.g., driver of the electric vehicle 105) to make a request for charging in which the request causes the corresponding power manager (e.g., 115, 120, and 125) to maximize mileage for the electric vehicle 105, minimize energy costs for the electric vehicle 105, and/or increase charging speed for the electric vehicle 105.

The smart energy distribution system 100 can include a combination of Electric Vehicle Service Equipment (EVSE) and energy management device (e.g., power managers 115, 120, and 125), which can include or otherwise interface with an intelligent monitoring apparatus (e.g., 175 and 110) that includes the connector (e.g., 110). The connector 110 can include one or more safety components for isolating high power from the user of the electric vehicle 105. The power managers (e.g., 115, 120, and 125) can communicate with the electric vehicles 105 using a low voltage pilot signal 118. The smart energy distribution system can include a connector 110 having one or more safety components that can dynamically regulate power management through communication with combination EVSE power manager devices (e.g., 115, 120, and 125) directly, indirectly, and/or over a network. The method of communication between EVSE can include wireless, locally, connected, wired, Ethernet, mesh network, full on/off timed system, and/or any suitable IP connected device.

The power managers (e.g., 115, 120, and 125) can communicate with each other and/or with the remote server 145 to prioritize one electric vehicle 105 over another electric vehicle 105 for charging. The prioritization can be based on user inputs via the user input device 190, state of charge information 185, a maximum rated charge level 195 of an installation, and/or a current sensor reading from the current sensor 130. The power managers (e.g., 115, 120, and 125) can communicate with each other and/or with the remote server 145 to generate a prioritization and average distribution 198. The prioritization and average distribution 198 can be regulated by customer input and rankings. The prioritization and average distribution 198 can be regulated by predictive time slicing gathered from past time slicing. The prioritization and average distribution 198 can be regulated by adaptive learning logic, which can improve the predications and prioritizations.

The prioritization and average distribution 198 can be regulated by how much the user wants to pay. The user can input via the user input device 190 how many miles desired from a given charging session and/or prioritize by a request to have the vehicle fully charged. The prioritization and average distribution 198 can be regulated by the control logic (e.g., 160 and/or 135) to provide a feedback loop. The feedback loop can provide a rate schedule for an electrical utility company 142. The electrical utility company 142 can recommend what rate schedule the charging location can use including suggestions for a cheapest rate.

Figure 2:
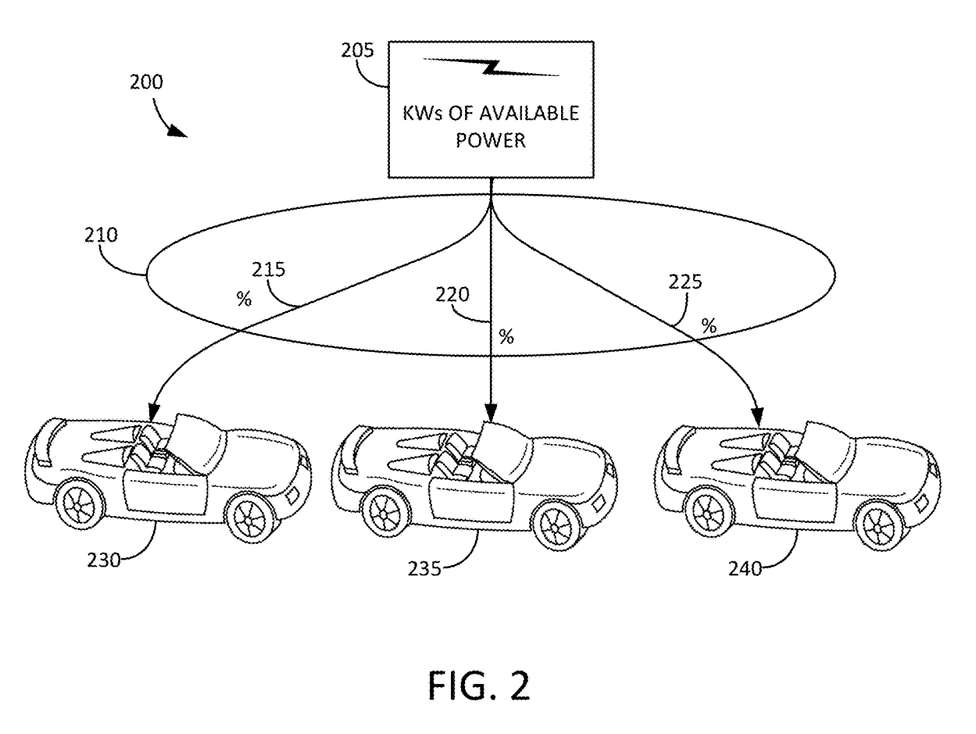
FIG. 2 illustrates a power balancing system from a limited power supply in accordance with embodiments of the present invention.

FIG. 2 illustrates a power balancing system 200 from a limited power supply or supplies 205 (hereinafter referred to as power supply 205) in accordance with embodiments of the present invention. For a given charging location (such as a multi-car garage, series of parking spaces, apartment building, or the like) associated with the power supply 205, there is a given amount of installed power (e.g., installed Kilowatts (KW)) that is available. Different percentages (e.g., 215, 220, and 225) of this available pool 205 can be allocated to multiple electric vehicles (e.g., 230, 235, and 240), respectively. According to embodiments of the invention disclosed herein, the percentages can be dynamically changed and controlled. For example, the power managers (e.g., 115, 120, and 125 of FIG. 1) and/or the remote server 145 (of FIG. 1) can dynamically change and control the different percentages of the available pool of power 205 that are allocated to each of the electric vehicles (e.g., 230, 235, and 240). The different percentages in the aggregate 210 are equal to 100% of the allocable power, which may take into account a buffer as further described below. Each allocation percentage can be the same as or different from another allocation percentage from among the allocation percentages.

Figure 3:
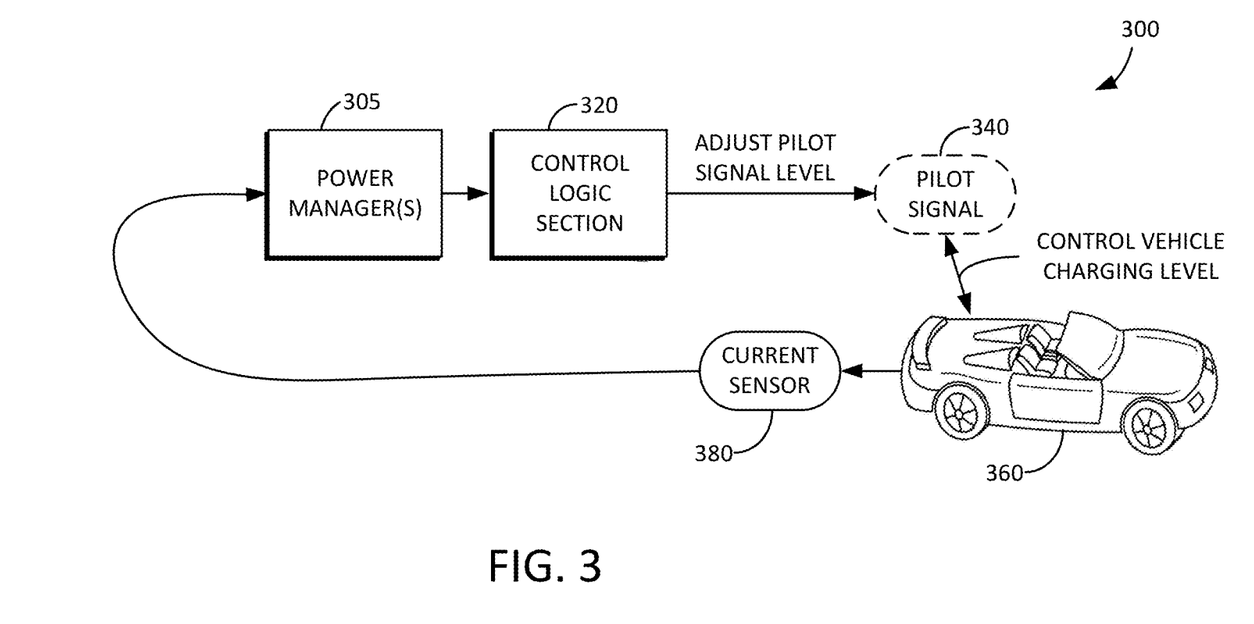
FIG. 3 illustrates a block diagram of a power manager and associated power regulation components in accordance with embodiments of the present invention.

FIG. 3 illustrates a block diagram of system 300 including a power manager 305 and associated power regulation components (e.g., 320 and 380) in accordance with embodiments of the present invention. The power manager 305 can receive information from a current sensor 380, and together with the control logic section 320, regulate the charging power of an electric vehicle 360. Although the control logic section 320 is shown as separate from the power manager 305, it will be understood that the power manager 305 can include the control logic section 320. The electric vehicle 360 can be allowed to draw using a pilot signal 340. In other words, the control logic section 320 can adjust a signal level of the pilot signal 340, thereby controlling the maximum charge level of the electric vehicle 360. The current sensor 380 can provide a feedback loop for the power manager 305 and/or the control logic section 320 for further adjusting of the pilot signal 340. The electric vehicle charge level of the electric vehicle 360 can therefore be controlled.

Figure 4:
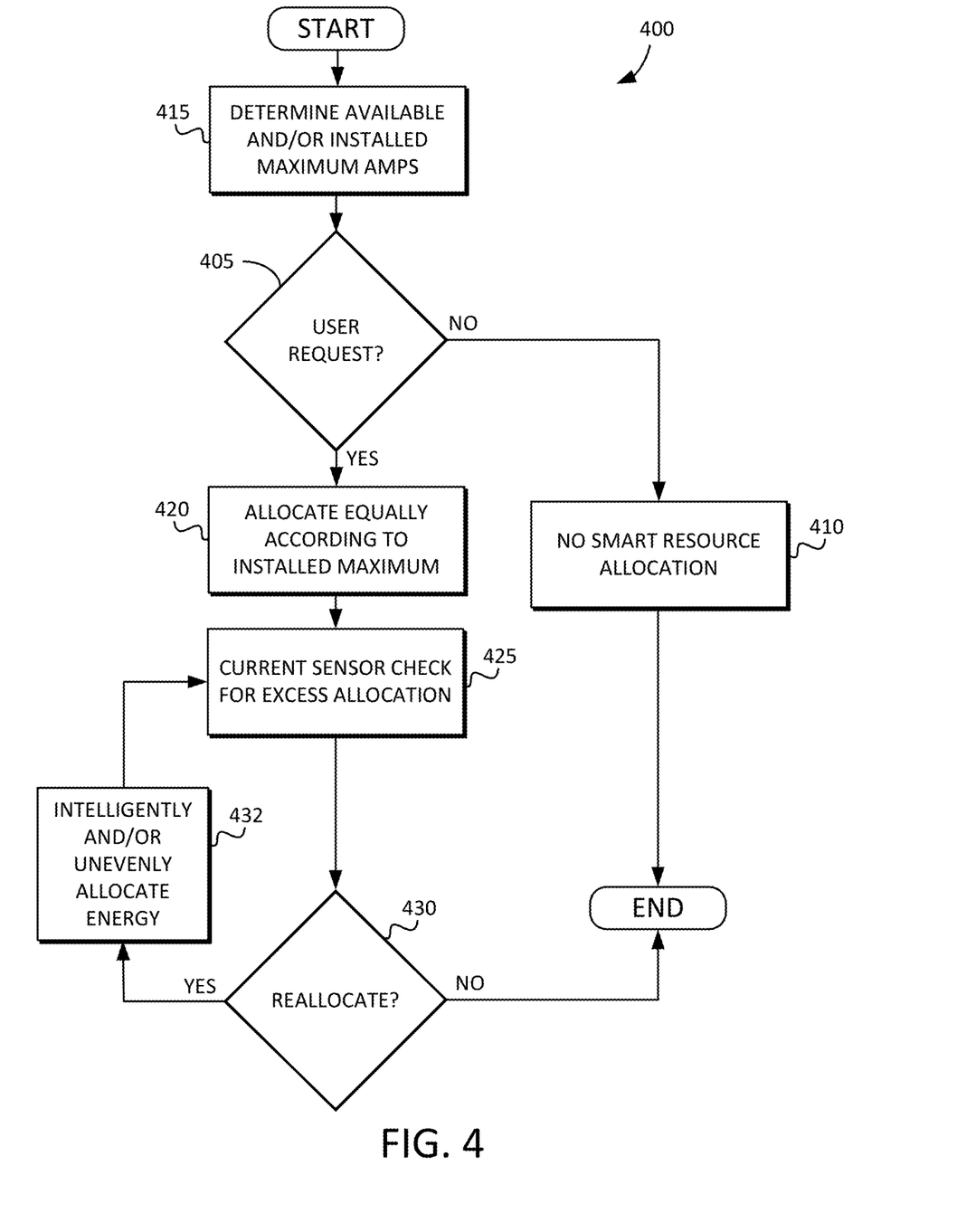
FIG. 4 shows a flow diagram illustrating a technique for providing smart energy distribution via an intelligent control signal in accordance with embodiments of the present invention.

FIG. 4 shows a flow diagram 400 illustrating a technique for providing smart energy distribution via an intelligent control signal in accordance with embodiments of the present invention. The technique can begin at 415, where an available and/or installed maximum power and/or Amperes (hereinafter referred to as "amps") can be determined. The available and/or installed maximum power and/or amps can be associated with a particular location such as a parking garage, apartment complex, parking lot, or the like. The flow can proceed to 405 where a determination can be made whether power is requested by a user (e.g., by an electric vehicle). If no power is requested, then there need not be any smart resource allocation, and therefore, the flow proceeds to no smart resource allocation at 410. Otherwise, if power is requested, then the system can initially distribute power to the electric vehicles equally at 420. The power may be distributed according to the maximum amount of installed power (e.g., available kilowatts (KW)) and/or amps for the location, with or without a buffer, as further described below. The power may be distributed to the electric vehicles based on the vehicle's rated acceptable or maximum levels.

At 425, the current sensor (e.g., 380 of FIG. 3) can be periodically checked to determine whether the amount of power allocated exceeds the real current that the vehicle is drawing. At 430, a determination can be made whether the amount of power distributed to the vehicles should be reallocated. In other words, the amount of current a vehicle is drawing over a period of time can be used to predict the rest of a charging cycle, as further explained below. If the amount of power distributed to the electric vehicles is to be reallocated, the flow can proceed to 432, where the energy can be intelligently and/or unevenly allocated among the electric vehicles, and then to 425 for additional checking of the current sensor for excess allocation. Otherwise, the flow proceeds along the NO path to end the technique. It will be understood that the steps and elements of FIG. 4 need not occur in the order shown, but rather, can occur in a different order or with intervening steps, or without some of the steps.

Figure 5:
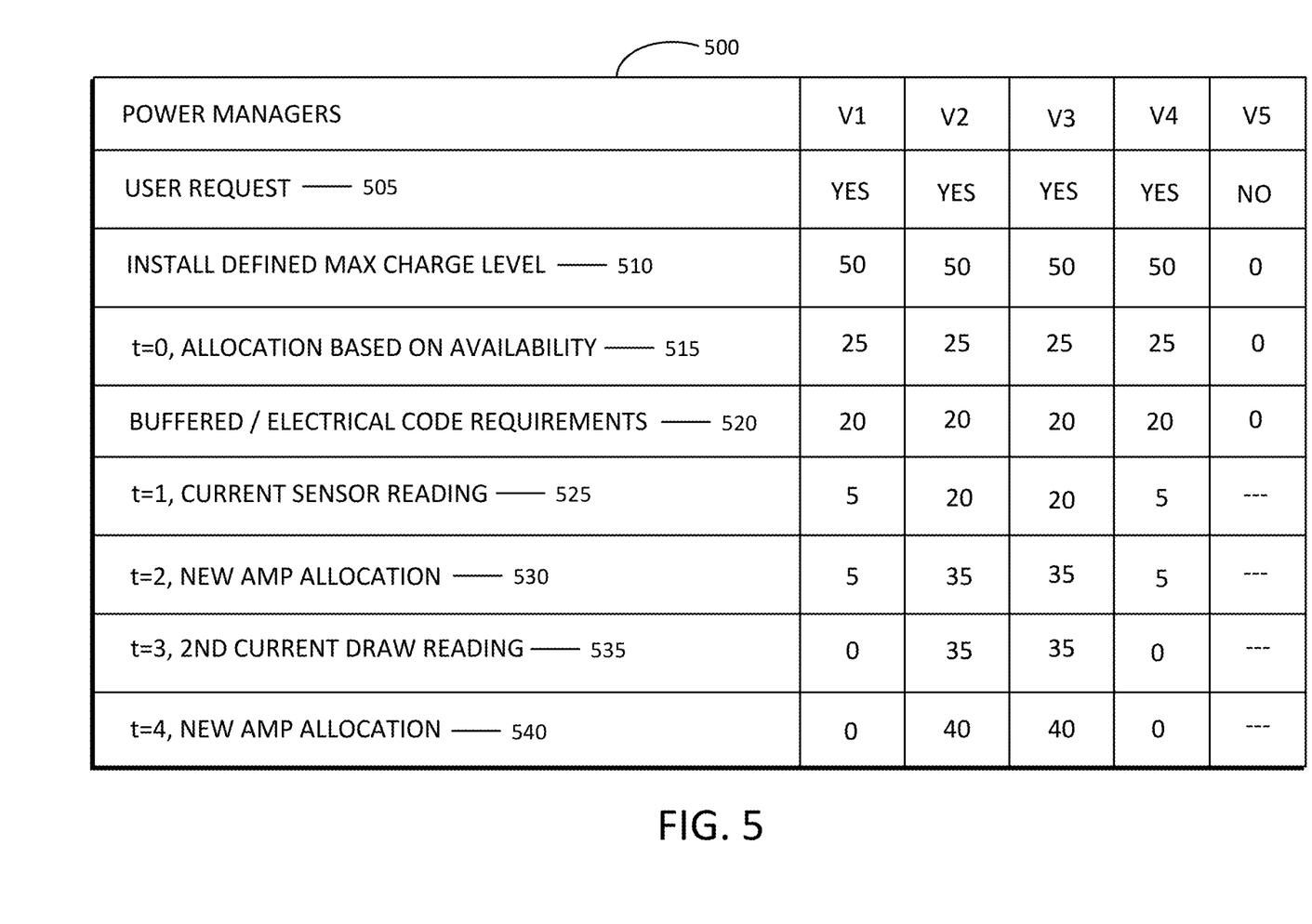
FIG. 5 illustrates a chart and associated technique for smart energy distribution to various electric vehicles in accordance with embodiments of the present invention.

FIG. 5 illustrates a chart 500 and associated technique for smart energy distribution to five vehicles in accordance with embodiments of the present invention. As can be seen in FIG. 5, five electric vehicles (V1, V2, V3, V4, and V5) are shown. It will be understood that the number of five electric vehicles is exemplary, and any suitable number of electric vehicles can be associated with the inventive techniques described herein. In this example, it is assumed that the given amount of installed amps for the charging location is 100 amps (e.g., a circuit rated at 100 amps). The technique involves a series of steps, denoted by 505 through 540. The number of amps that are intelligently allocated are numerically shown in the five columns associated with vehicles V1 through V5. The power managers (e.g., 305 of FIG. 3) can allocate an amount of allocable power among the vehicles V1 through V5. The allocable amount of power can be a total amount of installed power for a given location minus a buffer. The power managers can intelligently allocate the allocable amount of power according to a set of heuristics.

At 505, the user request indicates whether a person is trying to charge their electric vehicle at the present moment. The request can be made by an RFID signal or other suitable wired or wireless method. In this case, four of the five vehicles (i.e., V1, V2, V3, and V4) have requested power. V5 is fully charged and therefore is not requesting power at this time.

At 510, the defined charge level of each electric vehicle is shown. Each electric vehicle in this case takes a maximum of 50 amps to charge. Because V5 is already charged it requires 0 amps to charge. The 100 amp circuit cannot charge four vehicles at once with 50 amps each because the circuit only has 100 total amps of charging capacity, and four times 50 amps would be 200 amps, which exceeds the 100 total amps of capacity. Pertaining to 515, where time (t)=0, each charging system can simultaneously supply 25 amps from the 100 amp circuit to the four electric vehicles without exceeding the 100 amp installed limit, without taking into account any kind of buffer.

As shown at 520, to comply with electric governmentally imposed codes, each vehicle can receive 20 amps, for a total of 80 amps. V5 didn't request charging, so 0 amps are allocated to it. The remaining 20 amps (i.e., 100 minus 80) are not allocated to conform with government code. The remaining 20 amps provide a buffer between the total installed amps and the amount of amps that are intelligently allocated to the various electric vehicles.

At 525, time (t)=1, a current sensor can read that V2 and V3 are charging at a high level. This information can be accessed through a charge level application specific interface (API). By way of example, V2 and V3 can request priority charging, and therefore, can be charged at a higher priority. The higher priority charging can mean receiving a charge earlier in time and/or at a higher power level.

At 530, time (t)=2, vehicles V1 and V4 are nearing the end of the charge cycle, and so V1 and V4 are allocated five amps each. The vehicles V2 and V3 are not at the end of the charge cycle, and therefore vehicles V2 and V3 can be allocated 15 more amps each, up to a total of 35 amps each.

At 535, time (t)=3, another current draw reading can be performed, and it can be determined from the current draw reading that V1 and V4 are nearly finished charging. V2 and V3 continue to be allocated 35 amps each to ensure that electrical code requirements are still met while allowing V1 and V4 to safely finish charging.

At 540, time (t)=4, yet another current drawing reading can be performed, thereby determining that V1 and V4 are entirely finished charging. Therefore, V2 and V3 can be allocated an increased charging level of 40 amps each, still maintaining compliance with the electrical code requirements. In some embodiments, V2 and V3 are allocated their maximum charging level assuming that the code requirements can still be met.

The power managers (e.g., 305 of FIG. 3) can intelligently allocate an allocable amount of power among the electric vehicles for charging the electric vehicles. The allocable amount of power can be a total amount of installed power for a given location minus a buffer. The power managers can intelligently and unevenly allocate the allocable amount of power among the electric vehicles according to a set of heuristics. For example, the power managers can allocate, during a first time period, an equal fraction of the allocable amount of power to each of the electric vehicles. The power managers can allocate, during a second time period, a first fraction of the allocable amount of power to a first subset of the electric vehicles. The power managers can allocate during the second time period, a second fraction different from the first fraction of the allocable amount of power to a second subset of the vehicles. The power managers can allocate, during a third time period, a third fraction different from the first and second fractions of the allocable amount of power to the first subset of electric vehicles. The power managers can allocate, during a fourth time period, a fourth fraction different from the first, second, and third fractions of the allocable amount of power to the second subset of the electric vehicles, and so forth.

Figure 6:
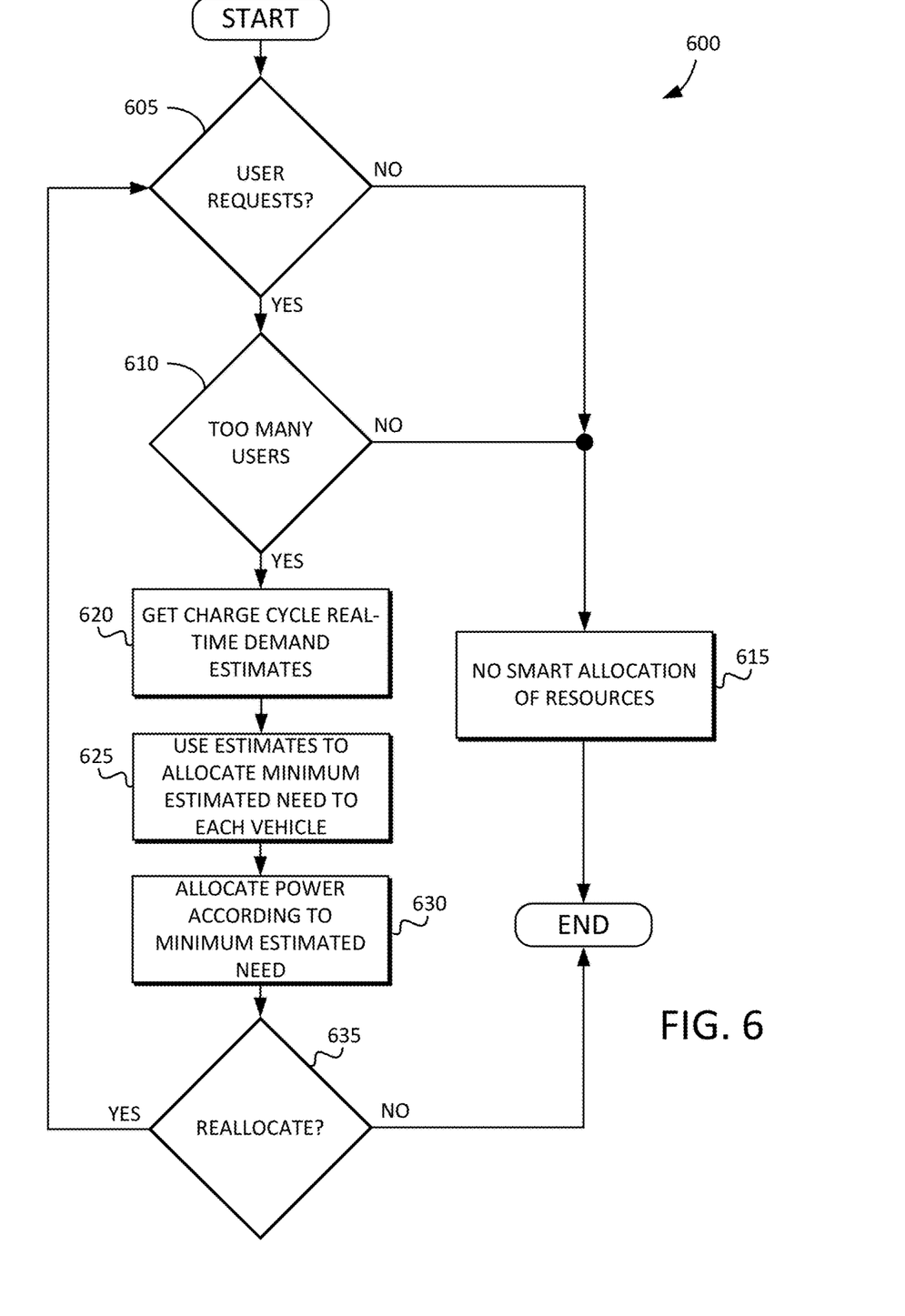
FIG. 6 shows a flow diagram illustrating another technique for providing smart energy distribution via an intelligent control signal in accordance with embodiments of the present invention.

FIG. 6 shows a flow diagram 600 illustrating another technique for providing smart energy distribution via an intelligent control signal in accordance with embodiments of the present invention. This technique involves a method of using the real time or recent charge estimates, determined either from a current sensor (e.g., 380 of FIG. 3), learning algorithm (e.g., within control logic 160 and/or 135 of FIG. 1), and/or an API, to access network based vehicle data, for example via network 150 (of FIG. 1), and use such data to allocate power to the electric vehicle or vehicles.

The technique can begin at 605 with a determination of whether there are user requests. If there are no user requests at 605, then no smart resource allocation needs to be made, and therefore the flow proceeds to 615. Otherwise, if there are user requests at 605, then the flow can proceed to 610 where a determination can be made whether there are too many users. The determination of whether there are too many users can be a determination of whether the charging and/or power demand associated with the number of electric vehicles present exceeds the total installed power and/or amps, taking into account any buffer. If YES, meaning that the charging need exceeds what is available (e.g., the total requested amps exceeds the total installed amps minus the buffer), then the flow can proceed to 620, where charge cycle real-time demand estimates can be determined. Otherwise, if NO, meaning that the charging need does not exceed what is available (e.g., the total requested amps is less than the total installed amps minus the buffer), then the flow can proceed to 615 where no smart allocation of resources is needed.

At 625, the estimates can be used to allocate minimum estimated need to each vehicle. At 630, power is allocated to the vehicles according to the minimum estimated need to each vehicle. At 635, a determination can be made whether power should be reallocated. If YES, the flow can return to 605 for further determinations and further charging. It will be understood that the steps and elements of FIG. 6 need not occur in the order shown, but rather, can occur in a different order or with intervening steps, or without some of the steps.

Figure 7:
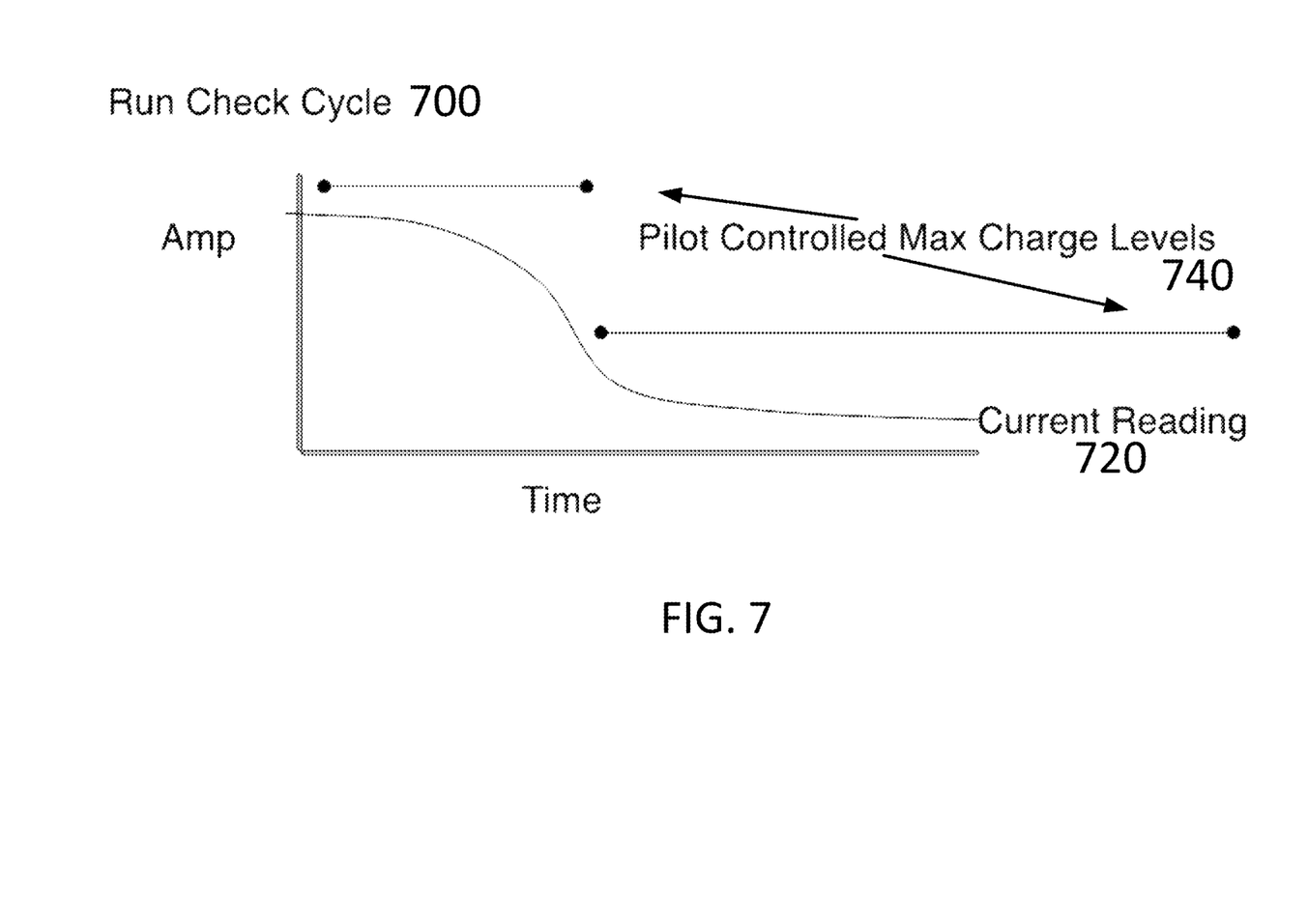
FIG. 7 illustrates a graph demonstrating the regulation of the electric vehicle charging in accordance with embodiments of the present invention.

FIG. 7 illustrates a graph demonstrating the regulation of the vehicle charging in accordance with embodiments of the present invention. The graph shows a run check cycle 700. The current reading 720 from the current sensor (e.g., 380 of FIG. 3) can be used to regulate the vehicle charging to a lower maximum without inhibiting an electric vehicle's charge time or charging cycle. As shown in this example, there are two pilot controlled maximum charge levels 740, which represent two different maximum charge levels 740 for two different times. In other words, as the charging of the electric vehicle progresses along the current reading curve 720, the pilot signal controlled max charge level 740 can be progressively lowered. In some embodiments, the pilot signal controlled max charge level 740 can be incrementally lowered as the charging of the electric vehicle progresses. Alternatively, the pilot signal controlled max charge level 740 can be continuously lowered as the charging of the electric vehicle progresses. The power managers (e.g., 305 of FIG. 3) can collectively and/or individually control the pilot signal controlled max charge level over time for each electric vehicle being charged.

Figure 8:
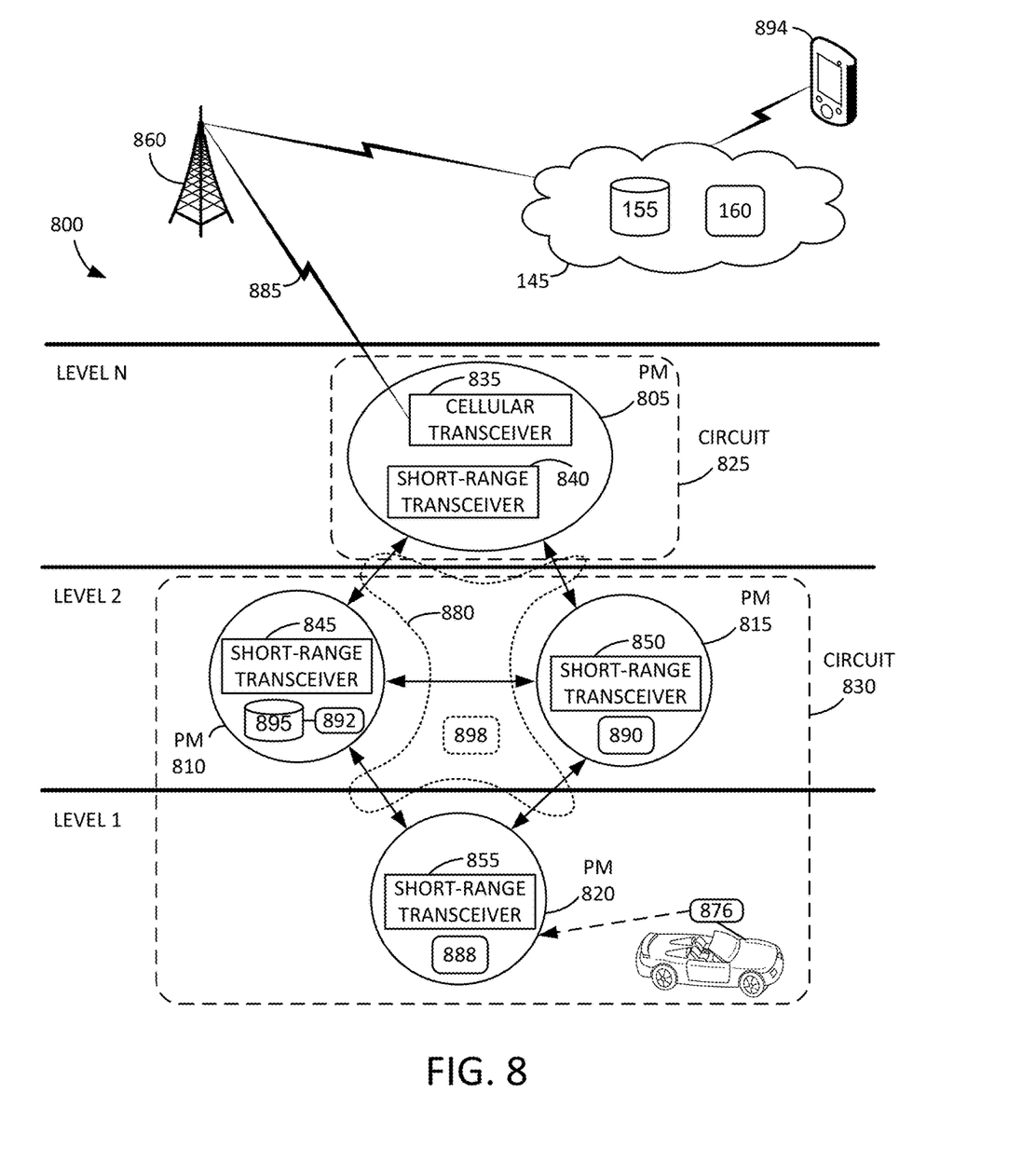
FIG. 8 illustrates a diagram of a multi-circuit multi-parking-level electric vehicle system including a local electric vehicle charging mesh network in accordance with embodiments of the present invention.

FIG. 8 illustrates a block diagram of a multi-circuit multi-parking-level electric vehicle charging system 800, including a local vehicle charging mesh network 880 in accordance with embodiments of the present invention. It is quite common in large apartment complexes or city-based parking garages to have multiple parking levels. The parking levels are often separated by thick concrete floors and walls, which can impede the transmission of wireless signals. Power managers (PMs) can be located on each parking level. Each PM can be incorporated into Electric Vehicle Supply Equipment (EVSE) or otherwise be separate from and/or connected to an EVSE.

For example, PM 820 can be located on level 1, PM 815 and PM 810 can be located on level 2, and PM 805 can be located on level N. It will be understood that any suitable number of PMs and parking levels can be part of the electric vehicle charging mesh network 800. A local short-range wireless electric vehicle charging mesh network 880 can interconnect the PM 805, the PM 810, the PM 815, and the PM 820. In other words, the local vehicle charging mesh network 880 can interconnect the short-range wireless transceivers of the PM 805, the PM 810, the PM 815, and the PM 820. Each of the PMs can receive, process, retransmit, and/or store data packets that are transmitted on the local vehicle charging mesh network 880 by each of the PMs. In other words, each of the PMs can receive, process, retransmit, and/or store all data packets that are transmitted on the local vehicle mesh network 880. It will be understood that any suitable number of parking levels and PM units can be included in the local short-range wireless electric vehicle charging mesh network 880. The effective reach of each short-range transceiver (e.g., 840, 845, 850, and 855) of each PM is lengthened, since connection to one node is sufficient to access the entire network. In other words, each short-range wireless transceiver (e.g., 840, 845, 850, and 855) within the local electric vehicle charging mesh network 880 "sees" all packets that are transmitted among the various nodes within the network. Thus, the reach of each node (i.e., PM) is expanded.

This technique is particularly useful in the multi-level garage application because as mentioned above, the natural conditions of these environments prohibit the typical range of wireless signals. One of the PMs, e.g. PM 805, can include a long-range transceiver such as a cellular transceiver 835 to connect the short-range wireless electric vehicle charging mesh network 880 to the Internet via a cellular connection 885. The cellular connection 885 can connect the cellular transceiver 835 to a cellular or radio tower 860, which can be connected to the Internet. The PM 805 can be situated in a spot that is suitable for cellular reception, which can be, for example, the top level of a multi-level parking structure. The long-range transceiver 835 of the PM 805 can connect the local vehicle charging mesh network 880 to the remote server 145 via the cellular connection 885. The remote server 145 can provide analytical information about the local vehicle charging mesh network 880, the electric vehicles associated with the vehicle charging mesh network 880, the power managers associated with the vehicle charging mesh network 880, the information stored thereon, and so forth.

Parking spaces are constructed of dense materials such as cement and steel, which impede conventional wireless networking solutions. This in turn diminishes the coordination and communication of different components of a conventional charging system or network. The long-range transceiver 835 can be located on a level of a parking structure that is higher in elevation than other levels, or at the highest level, so that a reliable connection can be made to the cellular tower 860 via the cellular connection 885. The long-range transceiver 835 can thus connect the local vehicle charging mesh network 880 to the remote server 145 via the cellular connection 885. Referring to FIG. 8, the level N of the parking structure can be higher in elevation than the level 2 of the parking structure, and the level 2 of the parking structure can be higher in elevation than the level 1 of the parking structure.

Each PM (e.g., 805, 810, 815, and 820) can be associated with a given circuit (e.g., 825 and 830). For example, as shown in FIG. 8, PM 810, PM 815, and PM 820 can be associated with circuit 830, whereas PM 805 can be associated with circuit 825. It will be understood that any suitable number of PMs can be associated with a given circuit. It will be understood that any suitable number of circuits can be associated with a particular location. In some embodiments, the association can also span multiple parking levels (e.g., PMs located on levels 1 and 2 are associated with circuit 830). Each PM can include control logic (e.g., 135 of FIG. 1) that makes it aware of which circuit it is associated with. The PM can be assigned a circuit or breaker identifier (ID) (e.g., 890) using a dip switch, a configurable setting such as a memory register, or the like. The local electric vehicle charging mesh network 880 can be collectively aware of which PMs are associated with which circuits, and can allocate electric vehicle charging resources and power levels accordingly.

The local electric vehicle charging mesh network 880 can record and/or log system change events 898 such as current levels of charging, electric vehicle disconnections, electric vehicle connections, charging completing, charging starting, charging levels, and the like. The system change events 898 can be stored on each PM, such as in storage unit 895 of PM 810. The change events can include a current level of charging event for a particular electric vehicle, an electric vehicle disconnection event from a particular PM from among the various PMs, and/or an electric vehicle connection event to a particular PM from among the various PMs. The change events can include a charge completing event for a particular electric vehicle and a charge starting event for the particular electric vehicle.

The system change events 898 can be associated with time and stored as a history of events, which can be used to predict future events based on a set of heuristics. In some embodiments, the history of events for each PM can be stored on each PM. In some embodiments, the history of events for a particular PM can be stored only for the particular PM. The local electric vehicle charging mesh network 880 can include a learning logic section (e.g., 888) to learn from the history and predict future behavior and future needs of EVs. Each PM can include the learning logic section (e.g., 888) to learn the history for that particular PM, for each of the PMs, and/or for the associated EVs. The learning logic section 888 can formulate or refine heuristics 892. The PMs can track individual electric vehicles using a vehicle identifier 876, such as radio frequency ID (RFID) tag and/or a near-field communication (NFC) tag. The PMs can track the individual electric vehicles via the local electric vehicle charging mesh network 880. Each PM can access the stored history (e.g., stored on 895) and apply the heuristics 892 to predict how much charge a particular electric vehicle will need at a particular time of day, and/or based on a particular day. Charging can be prioritized based on a user's usual arrival time, connection time, charging time, disconnection time, and/or time of leaving. Because all of the PMs have access to all of the data packets, change events, and stored history of the local vehicle charging mesh network 880, a particular electric vehicle can plug into any of the PMs, and the prediction techniques can still be used to improve the charging experience of the particular electric vehicle. The PMs can allocate among themselves the available power for each electric vehicle based at least on immediate demand and/or the heuristics 892. The PMs can provide a predictive readout of total charge time (e.g., current draw, charge length, position in queue, and the like) based at least on the heuristics 892. The PMs can reconfigure the level of charge provided to each electric vehicle based on the total power available for a given circuit. Because reconfiguring is an expensive operation in terms of time and/or electric vehicle charging protocol limitations, the amount of reconfiguring needed can be reduced by relying on the predictive heuristics 892.

For example, if a particular electric vehicle is known to only trickle charge at a particular time of day, then a trickle charge can be applied from the start, i.e., at the time the electric vehicle plugs in and requests a charge. By way of another example, a PM might determine that at 2 PM on weekdays a particular electric vehicle will need a full charge. By way of yet another example, just because an electric vehicle is first to plug into a given PM associated with a given circuit, that does not necessarily mean that that electric vehicle receives a full or maximum charging power level, but rather, based on the heuristics 892, that electric vehicle may receive from the start a reduced level of charging power.

The PMs can determine where each electric vehicle is in the charging cycle and adjust current and/or power levels up or down, using for example, the pilot signal described above. The charging cycle data can be represented and stored on 895 and/or the remote server (e.g., 145 of FIG. 1) as graphs, logs, change event lists, or the like. The PMs can determine whether the current day is a weekday or a weekend day and adjust accordingly. The heuristics 892 can also be used to determine safety buffers in the charging, and can take into account history and immediate needs. For example, the heuristics 892 can include information regarding the maximum installed power for a given location and the built-in buffer for adhering to government code. The PMs can provide predictive information to electric vehicle owners, such as estimations of time of charge completion, charging rate, or the like. Such information including the heuristics, the graphs, the logs, the change event list, the predictive information, or the like, can be stored on in the database 155 of the remote server 145. Electric vehicle owners can remotely access such information via a mobile device such as a smart phone or tablet (e.g., 894).

A particular PM (e.g., 805, 810, 815, and 820) can determine when a particular electric vehicle requests and receives a charge. The particular PM can determine an amount of charge that is needed to complete the charge. The PM can analyze past charge currents or events. The PM can match the pilot signal (e.g., 340 of FIG. 3) to draw a current that is equal to a predictive current draw for a particular electric vehicle based on the heuristics 892. In the event that an electric vehicle requests a "normal" maximum charging level, and the "normal" maximum charging level is unavailable due to circuit constraints, then the PM can use the heuristics 892 to determine a charging level that is less than the "normal" maximum charging level. The "less-than-normal" charging level can be a charge level that is less than the "normal" maximum charging level. For example, based on the heuristics 892, the PM can cause the less-than-normal charging level to be used to charge the particular electric vehicle.

Figure 9:
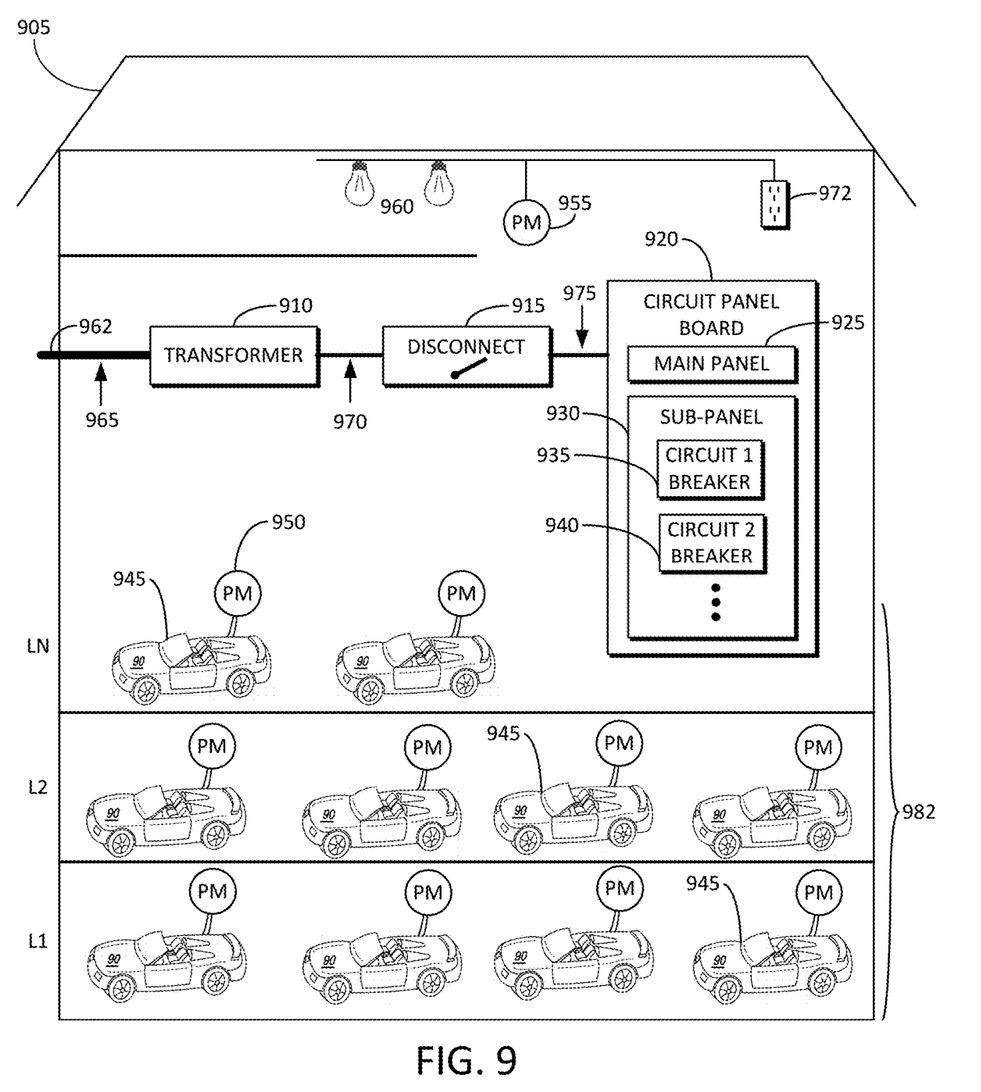
FIG. 9 illustrates a diagram of a multi-circuit multi-parking-level apartment complex including distributed power managers for controlling the distribution of power to electric vehicles and to other apartment appliances in accordance with embodiments of the present invention.

FIG. 9 illustrates a diagram of a multi-circuit multi-parking-level apartment complex 905 including distributed power managers (e.g., PMs 950 and 955) for controlling the distribution of power to electric vehicles (e.g., electric vehicle 945) and to other apartment appliances (e.g., lights 960) in accordance with embodiments of the present invention. It will be understood that while the term apartment complex is used with reference to FIG. 9 for the sake of illustrating an exemplary embodiment, other parking structures not necessarily associated with apartment complexes are equally applicable and suitable for incorporating the various embodiments of the invention as described herein. The apartment complex 905 can have an electrical mains 962 line associated therewith. The electrical mains 962 can be connected to a transformer 910. The transformer 910 can step down the voltage received over the mains 962. The transformer 910 can be connected to an electrical disconnect unit 915. The electrical disconnect unit 915 can be connected to a circuit panel board 920. The electrical disconnect 915 can disconnect or connect the transformer 910 from or to the circuit panel board 920. The circuit panel board 920 can include various sub-panels (e.g., 925 and 930). For example, the circuit panel board 920 can include a main panel 925 used for providing power to apartment appliances such as lights 960, plug outlets 972, or the like. Alternatively or in addition, the circuit panel board 920 can include one or more sub-panels 930 used for providing power charging to the electric vehicles 945.

The one or more sub-panels 930 can include multiple circuits (e.g., circuit 1 and circuit 2), with associated breakers (e.g., breaker 935 and breaker 940) for each circuit. The circuit 1 can be associated with a sub-set of PMs, such as those PMs located on level N (i.e., LN) of the parking garage. The circuit 2 can be associated with a different sub-set of PMs, such as a portion of the PMs on level 1 (i.e., L1) and/or a portion of the PMs on level 2 (i.e., L2) of a parking garage of the complex 905. A local electric vehicle charging mesh network 880, as described above with reference to FIG. 8, can interconnect the PMs throughout the apartment complex 905 and/or the associated parking garage 982 including those PMs associated with charging the electric vehicles 945, and those PMs (e.g., 955) associated with powering other appliances such as the lights 960 or via the plug outlet 972.

Measurement points can be located along the chain of power supply components. For example, a measurement point can be located at 965 associated with the mains 962. A measurement point can be located at 970 between the transformer 910 and the disconnect 915. A measurement point can be located at 975 between the disconnect 915 and the circuit panel board 920, and so forth. The local electric vehicle charging mesh network 880 (of FIG. 8) can monitor the measurement points along this chain, and adjust the distribution of power throughout the apartment complex 905 responsive to the measurements. For example, the local electric vehicle charging mesh network 880 can monitor the aggregate amount of power available relative to the aggregate amount of power currently being consumed. The local electric vehicle charging mesh network 880 can automatically reconfigure an amount of power being used by each circuit within the circuit panel board 920. In the case where there are more installed circuits than what the transformer 910 can safely support in a simultaneous fashion, the local electric vehicle charging mesh network 880 can cause power to disabled to certain circuits and power to be enabled to other circuits during different time periods. The local electric vehicle charging mesh network 880 can rank and prioritize which circuits get power and/or the level of power available to each circuit. At the individual PM level, each PM within the local vehicle charging mesh network 880 can determine how much power (e.g., based on a current level controlled by a pilot signal such as 340 of FIG. 3) a particular electric vehicle is allowed to draw in view of the present state of the local electric vehicle mesh network 880. In other words, each PM can be self-aware of the overall power usage across the network of PMs in view of the power limitations of each circuit, and in view of the power limitations of the transformer 910, and make autonomous charging decisions based at least on such information. The PMs can also rely on predictive heuristics (e.g., 892 of FIG. 8) to balance the distribution of the available power among the electric vehicles and other apartment appliances.

It will be understood that even though the electric vehicle charging network is preferably a local electric vehicle charging mesh network 880 as described herein, the network can also be configured in a server/client arrangement and/or a master/slave arrangement.

The following discussion is intended to provide a brief, general description of a suitable machine or machines in which certain aspects of the invention can be implemented. Typically, the machine or machines include a system bus to which is attached processors, memory, e.g., random access memory (RAM), read-only memory (ROM), or other state preserving medium, storage devices and units, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the inventive concepts as described herein.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An electric vehicle charging system, comprising:
a first power manager that is located on a first level of a parking structure, the first power manager including a short-range wireless transceiver;
a second power manager that is located on a second level of the parking structure, the second power manager including a short-range wireless transceiver; and
a local electric vehicle charging mesh network configured to interconnect the short-range wireless transceiver of the first power manager and the short-range wireless transceiver of the second power manager,
wherein:
the first power manager is configured to receive first data packets that are transmitted by the second power manager on the local electric vehicle charging mesh network;
the second power manager is configured to receive second data packets that are transmitted by the first power manager on the local electric vehicle charging mesh network;
at least one of the first power manager or the second power manager includes a long-range cellular transceiver; and
the long-range cellular transceiver is configured to connect the local electric vehicle charging mesh network to a remote server via a cellular connection.

2. The electric vehicle charging system of claim 1, wherein the second level of the parking structure is higher than the first level of the parking structure.

3. The electric vehicle charging system of claim 1, wherein the first power manager is configured to receive, process, and retransmit the first data packets that are transmitted on the local electric vehicle charging mesh network by the second power manager, and the second power manager is configured to receive, process, and retransmit the second data packets that are transmitted on the local electric vehicle charging mesh network by the first power manager.

4. The electric vehicle charging system of claim 1, wherein each of the first power manager and the second power manager includes a storage unit that is configured to store change events, and wherein the local electric vehicle charging mesh network is configured to transmit the change events among the first power manager and the second power manager.

5. The electric vehicle charging system of claim 4, wherein the change events include at least one of a current level of charging for a particular electric vehicle, an electric vehicle disconnection event from a particular power manager from among the first power manager and the second power manager, or an electric vehicle connection event to a particular power manager from among the first power manager and the second power manager.

6. The electric vehicle charging system of claim 4, wherein the change events include at least one of a charge completing event for a particular electric vehicle or a charge starting event for the particular electric vehicle.

7. The electric vehicle charging system of claim 4, wherein each of the first power manager and the second power manager is configured to store, in the storage unit, a history of the change events.

8. The electric vehicle charging system of claim 7, wherein each of the first power manager and the second power manager is configured to predict future events based at least on the history of the change events and a set of heuristics.

9. The electric vehicle charging system of claim 8, wherein the set of heuristics includes a maximum amount of installed power for a given location and a built-in buffer for adhering to government code.

10. The electric vehicle charging system of claim 8, wherein the set of heuristics includes a normal charging level for a particular electric vehicle and a less-than-normal charging level for the particular electric vehicle, and wherein the first power manager and the second power manager are configured to determine whether the particular electric vehicle should receive the normal charging level or the less-than-normal charging level based on the set of heuristics.

11. The electric vehicle charging system of claim 8, wherein each of the first power manager and the second power manager includes a learning logic section configured to formulate or refine the set of heuristics.

12. The electric vehicle charging system of claim 1, further comprising a plurality of circuits, wherein each of the first power manager and the second power manager includes a circuit identifier (ID) that identifies which circuit from among the plurality of circuits is associated with a corresponding power manager.

13. The electric vehicle charging system of claim 1, wherein the first power manager and the second power manager are configured to track via the local electric vehicle mesh network a plurality of electric vehicle identifiers associated with a corresponding plurality of electric vehicles.

14. An electric vehicle charging system, comprising:
a first power manager that is located at a charging location, the first power manager including a short-range wireless transceiver;
a second power manager that is located at the charging location, the second power manager including a short-range wireless transceiver; and
a local electric vehicle charging mesh network configured to interconnect the short-range wireless transceiver of the first power manager and the short-range wireless transceiver of the second power manager,
wherein:
the first power manager is configured to receive first data packets that are transmitted by the second power manager on the local electric vehicle charging mesh network;
the second power manager is configured to receive second data packets that are transmitted by the first power manager on the local electric vehicle charging mesh network;
at least one of the first power manager or the second power manager includes a long-range cellular transceiver; and
the long-range cellular transceiver is configured to connect the local electric vehicle charging mesh network to a remote server via a cellular connection,
wherein:
each of the first power manager and the second power manager includes a storage unit that is configured to store change events, and wherein the local electric vehicle charging mesh network is configured to transmit the change events among the first power manager and the second power manager;
the change events include at least one of a current level of charging for a particular electric vehicle, an electric vehicle disconnection event from a particular power manager from among the first power manager and the second power manager, an electric vehicle connection event to a particular power manager from among the first power manager and the second power manager, a charge completing event for a particular electric vehicle, or a charge starting event for the particular electric vehicle;
each of the first power manager and the second power manager is configured to store, in the storage unit, a history of the change events;
each of the first power manager and the second power manager is configured to predict future events based at least on the history of the change events and a set of heuristics; and
the set of heuristics includes a maximum amount of installed power for a given location and a built-in buffer for adhering to government code.

15. The electric vehicle charging system of claim 14, wherein the first power manager is configured to receive, process, and retransmit the first data packets that are transmitted on the local electric vehicle charging mesh network by the second power manager, and the second power manager is configured to receive, process, and retransmit the second data packets that are transmitted on the local electric vehicle charging mesh network by the first power manager.

16. The electric vehicle charging system of claim 14, wherein:

the set of heuristics includes a normal charging level for a particular electric vehicle and a less-than-normal charging level for the particular electric vehicle, and wherein the first power manager and the second power manager are configured to determine whether the particular electric vehicle should receive the normal charging level or the less-than-normal charging level based on the set of heuristics; and each of the first power manager and the second power manager includes a learning logic section configured to formulate or refine the set of heuristics.

17. An electric vehicle charging system, comprising:

a first power manager that is located at a charging location, the first power manager including a short-range wireless transceiver;

a second power manager that is located at the charging location, the second power manager including a short-range wireless transceiver; and a local electric vehicle charging mesh network configured to interconnect the short-range wireless transceiver of the first power manager and the short-range wireless transceiver of the second power manager, wherein:

the first power manager is configured to receive first data packets that are transmitted by the second power manager on the local electric vehicle charging mesh network;

the second power manager is configured to receive second data packets that are transmitted by the first power manager on the local electric vehicle charging mesh network;

at least one of the first power manager or the second power manager includes a long-range cellular transceiver;

the long-range cellular transceiver is configured to connect the local electric vehicle charging mesh network to a remote server via a cellular connection; and wherein the first power manager and the second power manager are configured to:

allocate, during a first time period, an equal fraction of an allocable amount of power to each of a plurality of electric vehicles;

charge the plurality of electric vehicles according to the allocation during the first time period;

allocate, during a second time period, a first fraction of the allocable amount of power to a first subset of the plurality of electric vehicles; and charge the first subset of the plurality of electric vehicles according to the allocation during the second time period.

18. The electric vehicle charging system of claim 17, wherein the first power manager and the second power manager are configured to:

allocate, during the second time period, a second fraction different from the first fraction of the allocable amount of power to a second subset of the plurality of electric vehicles;

charge the second subset of the plurality of electric vehicles according to the allocation during the second time period;

allocate, during a third time period, a third fraction different from the first and second fractions of the allocable amount of power to the first subset of the plurality of electric vehicles;

charge the first subset of the plurality of electric vehicles according to the allocation during the third time period;

allocate, during a fourth time period, a fourth fraction different from the first, second, and third fractions of the allocable amount of power to the second subset of the plurality of electric vehicles; and charge the second subset of the plurality of electric vehicles according to the allocation during the fourth time period.

* * * * *